United States Patent
Dillinger et al.

(10) Patent No.: US 9,867,063 B2
(45) Date of Patent: Jan. 9, 2018

(54) RADIO COMMUNICATIONS SYSTEM

(71) Applicant: Huawei Technologies Co., Ltd., Shenzhen, Guangdong (CN)

(72) Inventors: Markus M. Dillinger, Munich (DE); Nikola Vucic, Munich (DE); Hermann Hartwig, Munich (DE); Robert Eigenmann, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 14/822,117

(22) Filed: Aug. 10, 2015

(65) Prior Publication Data

US 2015/0350931 A1     Dec. 3, 2015

Related U.S. Application Data

(63) Continuation of application No. PCT/EP2013/052601, filed on Feb. 8, 2013.

(51) Int. Cl.
| | |
|---|---|
| *H04W 4/00* | (2009.01) |
| *H04W 24/02* | (2009.01) |
| *H04W 72/04* | (2009.01) |
| *H04W 48/18* | (2009.01) |
| *H04L 12/801* | (2013.01) |
| *H04W 28/12* | (2009.01) |
| *H04W 92/04* | (2009.01) |
| *H04W 88/08* | (2009.01) |

(52) U.S. Cl.
CPC .............. *H04W 24/02* (2013.01); *H04L 47/14* (2013.01); *H04W 28/12* (2013.01); *H04W 48/18* (2013.01); *H04W 72/0486* (2013.01); *H04W 88/085* (2013.01); *H04W 92/045* (2013.01)

(58) Field of Classification Search
None
See application file for complete search history.

(56) References Cited

U.S. PATENT DOCUMENTS

| | | | | |
|---|---|---|---|---|
| 8,588,698 | B2 * | 11/2013 | Brisebois .............. | H04W 88/06 455/63.1 |
| 2002/0089958 | A1 * | 7/2002 | Feder .................. | H04L 12/4633 370/338 |

(Continued)

FOREIGN PATENT DOCUMENTS

EP     2 525 623 A2     11/2012

OTHER PUBLICATIONS

Vikram Chandrasekhar, et al., "Femtocell Networks: A Survey", IEEE Communications Magazine, Sep. 2008, p. 59-67.

(Continued)

*Primary Examiner* — Phirin Sam

(57) ABSTRACT

The invention relates to a radio communications system, comprising: a mobile network comprising a line of signal processing blocks and dispatching means switchable to data taps of the line of signal processing blocks; and a base station comprising a line of signal processing blocks and dispatching means switchable to data taps of the line of signal processing blocks, wherein the mobile network and the base station are configured to exchange configuration information in order to switch the dispatching means of the mobile network in correspondence to the dispatching means of the base station.

9 Claims, 8 Drawing Sheets

(56) References Cited

U.S. PATENT DOCUMENTS

| | | | |
|---|---|---|---|
| 2006/0227736 A1 | 10/2006 | Conyers et al. | |
| 2010/0075678 A1* | 3/2010 | Akman | H04L 43/50 455/436 |
| 2010/0296469 A1 | 11/2010 | Zhou et al. | |
| 2014/0036762 A1* | 2/2014 | Al-Shalash | H04W 76/025 370/315 |
| 2014/0162682 A1* | 6/2014 | Tafreshi | H04W 24/02 455/456.1 |
| 2015/0043437 A1* | 2/2015 | Chakraborty | H04W 72/082 370/329 |
| 2015/0094012 A1* | 4/2015 | Gurajala | G06Q 30/016 455/404.1 |
| 2015/0172119 A1* | 6/2015 | Mahaffey | H04L 67/14 370/254 |
| 2016/0353351 A1* | 12/2016 | Huber | G06Q 20/1235 |

OTHER PUBLICATIONS

"C-RAN, the Road Towards Green RAN", White Paper, Version 2.5, China Mobile Research Institute, Oct. 2011, 48 pages.
Clark Chen, et al., "Suggestions on Potential Solutions to C-RAN", NGMN Alliance, Jan. 3, 2013, 41 pages.

* cited by examiner

RADIO COMMUNICATIONS SYSTEM

CROSS-REFERENCE TO RELATED APPLICATIONS

This application is a continuation of International Application No. PCT/EP2013/052601, filed on Feb. 8, 2013, which is hereby incorporated by reference in its entirety.

BACKGROUND

The present invention relates to a radio communications system, a mobile network and a base station. The invention further relates to a method for processing a radio communications system comprising a mobile network and a base station.

Radio access network solutions need to be prepared for strongly growing traffic in terms of usage, active subscribers and, in the case of emerging markets, population density. The current trends show, however, that this traffic growth is accompanied by flattening revenues of the mobile network operators. For addressing the exponential traffic growth, the operators will have to increase the density of the radio sites. While this has been proven by "V. Chandrasekhar, J. G. Andrews, and A. Gatherer, Femtocell Networks: A Survey, IEEE Communications Magazine, September 2008" to be the most effective way to increase the capacity of wireless networks, high radio sites deployment densities naturally lead to significantly increased operational expenditures. An important aspect for the future mobile network is the required capacity of backhaul links. Namely, it is not only that the increased user-generated traffic will have to be matched by the deployed backhaul links. Coupled with the traffic increase, significant overheads in transmission will emerge as well. Namely, the problem of interference barrier will become more pronounced in dense networks and solutions for interference mitigation will have to be deployed. These solutions will typically require large amounts of additional backhaul capacity as described by "P. Marsch et. al., Coordinated Multi-Point Mobile Communications, Cambridge University Press, 2011" and high investments in this area will be necessary. On the other hand, an important trend to be considered is the reduction in prices for the baseband processing hardware of radio base stations. It is expected that the form factor for the baseband processing in the small base station approaches that of a remote radio head without baseband processing (of the so called "milk bottle" size). Such a development can have a major impact on future mobile network architectures.

In contemporary radio system architectures, signal processing is completely centralized and therefore creates high costs for the optical radio site backhaul. In such systems, the backhaul traffic profile is constantly high in the area of up to 1000 times compared to end-user traffic. Additionally, it is not fluctuating over time as the end-user traffic does. This problem is exacerbated by the fact that the operators will often have to lease or share the backhaul, because fiber roll-outs are executed by incumbent operators, not necessarily the mobile network operators. The charges for this amount of capacity are unpredictable today, because the realization of the corresponding backhaul requires the deployment of next generation optical access technologies being launched in mid-term from now. Further, the radio traffic volume of the radio sites can be critical in shared medium scenarios with other services, e.g., triple play, enterprise, etc.

Today, there are two known base station or radio solution concepts for high capacity scenarios in dense urban areas which are "Distributed Base Station Architecture" and "Small Base Station Architecture".

The Distributed Base Station concept assumes base-band pooling of radio base stations with optional radio features like, e.g., IC and joint transmission which can significantly improve the spectrum efficiency and reduce the necessary number of radio sites deployed. The layer 1/layer 2/layer 3 (L1/L2/L3) processing in the radio is placed in an extra node connected to the base stations as a so called "master". The remote radio head includes only basic functions such as amplifiers, filters, and analog-digital conversion/digital-analog conversion functions, cf. "C-RAN, The Road Towards Green RAN", China Mobile Research Institute White Paper, October 2011, http://labs.chinamobile.com/report/view_59826. The efficiency gain of centralized processing is strongly depending on the end-user traffic load over the day. Strong gain is only achieved in peak load hours and for small inter-site density. In other words, the gains are high typically only in interference limited situations. The DBS requires Common Public Radio Interface interfaces, cf. "Common Public Radio Interface (CPRI), Interface Specification v4.2, September 2010, http://www.cpri.info" with very high bandwidth demands for several Gbps, e.g., 30 Gbps for LTE, 20 MHz, 4×4 multiple input multiple output, 3 sectors/site. In other words, the distributed base station concept yields highest spectral efficiency at the expense of highest backhaul demands.

The small base station concept assumes a conventional small base station for all radio standards such as LTE, WiMAX, etc., and it is also related to the small cell concept specified by the Small Cell Forum "http://www.smallcellforum.org/". The small base station concept includes namely all base station functions defined by the standards. However, its mechanical dimensions are comparable to RRH dimensions. It has much less backhaul requirements, about a factor of 20-50 less, and only line interface requirements such as Abis, IuB and S1 according to 3GPP standardization need to be fulfilled. As there is no centralized processing on lower layers, interference cancellation is less efficient than in DBS and hence spectral efficiency is lower than in the DBS case.

SUMMARY

It is the object of the invention to provide a concept for a flexible radio system architecture that provides high spectral efficiency for high and for low end-user traffic loads.

This object is achieved by the features of the independent claims. Further implementation forms are apparent from the dependent claims, the description and the figures.

The invention is based on the finding that a flexible radio system architecture can be implemented by an Adaptable Radio Architecture Processing providing flexible data tapping and signal processing supporting small base station and distributed base station concepts in an adaptive manner. During the setup of the network, the FSBSs send their profile to their main mobile network. Depending on the radio situation, the mobile network chooses different data tapping and signal processing modes. The protocol monitoring for network optimization can be optionally performed in a centralized manner. Signal processing blocks which are not used can be switched off.

Data tapping specifies the accessing a signal, e.g. a data stream with respect to an interface to the signal. Flexible data tapping specifies the flexible accessing the signal or data stream, wherein flexible refers to a flexibility of selecting a desired interface to the signal or data stream. The data stream may be a transmit data stream or a receive data stream. The signal passes different signal processing blocks which are configured for processing the signal, e.g. performing a protocol stack on the signal thereby influencing the signal. Each signal processing block may process a respective layer of the protocol stack. After each signal processing block an interface is provided for accessing the signal processed by that signal processing block. Flexible data tapping provides flexible accessing to the different interfaces with respect to a radio architecture. That flexible data tapping with respect to a radio architecture is also called adaptable radio architecture processing. If flexible tapping is provided in both, base station and mobile network, the signal processing blocks can be flexible accessed to either the base station or the mobile network such that both entities process a required protocol stack but are free to select which entity is processing which layer of the protocol stack in accordance to the adaptable radio architecture processing. A data tap specifies the line tap or the branch point where the signal, the information or the data is coupled out.

In the following, the above-mentioned protocol stack is described in detail: Firstly, a communications protocol is a system of digital message formats and rules for exchanging those messages in or between computing systems and in telecommunications. A protocol may have a formal description. Protocols may include signaling, authentication and error detection and correction capabilities. A protocol definition defines the syntax, semantics, and synchronization of communication; the specified behavior is typically independent of how it is to be implemented. A protocol can therefore be implemented as hardware or software or both. Communication protocols have to be agreed upon by the parties involved. To reach agreement a protocol may be developed into a technical standard. Communicating systems use well-defined formats for exchanging messages. Each message has an exact meaning intended to provoke a defined response of the receiver. A protocol therefore describes the syntax, semantics, and synchronization of communication. A radio communications protocol is a communications protocol specifying communications in a radio communication network.

Radio communications protocols in use are designed to function in very complex and diverse settings. To ease design, radio communications protocols are structured using a layering scheme as a basis, e.g. a layering scheme introduced by the OSI model. Instead of using a single universal protocol to handle all transmission tasks, a set of cooperating protocols fitting the layering scheme is used. The actual protocols are collectively called the radio protocol suite.

The radio communications protocol stack is an implementation of a radio protocol suite. The terms are often used interchangeably. Strictly speaking, the suite is the definition of the protocols, and the stack is the software or hardware implementation of them. Individual protocols within a suite are often designed with a single purpose in mind. This modularization makes design and evaluation easier. Because each protocol module usually communicates with two others, they are commonly imagined as layers in a stack of protocols. The lowest protocol always deals with "low-level", physical interaction of the hardware. Every higher layer adds more features. User applications usually deal only with the topmost layers.

An implementation form of the invention supplements Adaptable Radio Architecture Processing by supporting Backhaul Aware Radio Cells. The key idea behind BARC is to select suitable backhaul modes with respect to the above stated problems. With BARC, the following problems of the completely centralized signal processing present in certain contemporary radio system architectures can be solved: The data tapping is aware of the performance of the network backend and especially the backhaul network connected to the cells. The possible decrease in Quality of Experience of the end user by, e.g., increasing ping delays, is considered. The radio access network is adapted to the limits of the backhaul, e.g. bandwidth and delay and/or jitter.

An additional advantage is that the operator is able to balance between the end-user performance and the backhaul capacity cost.

In order to describe the invention in detail, the following terms, abbreviations and notations will be used:
  ARAP: Adaptable Radio Architecture Processing,
  ASIC: Application Specific Integrated Circuit,
  BARC: Backhaul Aware Radio Cells,
  BH PS: Backhaul Policy Server,
  BS: Base Station,
  BTS: Base Transceiver
  BW: Station,
  Cfg: Bandwidth,
  CN: Configuration command, Core Network,
  CoMP: Coordinated Multi-Point Transmission,
  CPRI: Common Public Radio Interface,
  DBS: Distributed BS,
  DL: Downlink,
  DSP: Digital Signal Processor,
  FSBS: Flexible SBS,
  GGSN: Gateway GPRS Support Node,
  GPON: Gigabit Passive Optical Network,
  GPS: Global Positioning
  IC: System, Interference Cancellation,
  L1/2/3 processing: Layer 1/2/3 processing (according to the OSI architecture),
  MAC: Medium Access Control,
  MN: Mobile Network,
  MNO: Mobile Network Operator,
  MSC: Mobile Switching Center,
  OBRI: Open Baseband Radio Interface,
  QoE: Quality-of-Experience,
  QoS: Quality-of-Service,
  RE: Radio Equipment,
  REC: Radio Equipment
  RLC: Control, Radio Link Control,
  RRH: Remote Radio Head,
  RS: Radio Server,
  Rx: Receiver,
  SBS: Small Base Station,
  SPB: Signal Processing Block,
  SON: Self-Optimizing Network,
  S/N: Signal-to-Noise Ratio,
  Tx: Transmitter,
  UL: Uplink.

According to a first aspect, the invention relates to a radio communications system, comprising: a MN comprising a line of signal processing blocks and dispatching means switchable to data taps of the line of signal processing blocks; and a BS comprising a line of signal processing blocks and dispatching means switchable to taps of the line of signal processing blocks, wherein the MN and the BS are configured to exchange configuration information in order to switch the dispatching means of the MN in correspondence to the dispatching means of the BS.

Due to the flexible data tapping both in the BS and the MN, the radio communications system provides a flexible architecture with high spectral efficiency for high and for low end-user traffic loads.

In a first possible implementation form of the radio communications system according to the first aspect, the switching of the dispatching means of the MN in correspondence to the dispatching means of the BS is based on profiling information provided by the BS.

Depending on the radio situation, the MN can choose different data tapping and signal processing modes. The radio communications system is able to flexibly react on changing traffic loads.

In a second possible implementation form of the radio communications system according to the first implementation form of the first aspect, the profiling information determining an actual chosen data tapping and corresponding signal processing of the data taps comprises at least one of the following: a profiling part representing quality of service on an air interface of the radio communications system, comprising: interference situation information in UL and DL at receiver side, in particular per user in a radio cell of the radio communications system; and a profiling part representing quality of service in a backhaul network, comprising at least one of the following: a number of supported frequency blocks, available radio technologies, a number of supported signal processing blocks, and provisioned backhaul standard and technologies, in particular SDH, TDM, ATM and IP.

Depending on the radio situation the MN chooses different data tapings and corresponding signal processing modes, e.g., to realize the classical distributed radio architecture (the first interface, CPRI base is chosen). In situations, where central IC does not improve network performance (RS IC), it can be switched off by choosing the classical line interface. In this case, the line interface connects directly to the CN functions (GGSN, MSC . . . ).

The radio communications system is able to adapt to changing radio standards.

In a third possible implementation form of the radio communications system according to the first implementation form or according to the second implementation form of the first aspect, the MN and the BS are configured to switch their dispatching means based on the profiling information.

The operator is thus able to balance between the end-user performance and the backhaul capacity cost.

In a fourth possible implementation form of the radio communications system according to the first aspect as such or according to any of the preceding implementation forms of the first aspect, the signal processing blocks of the BS and the signal processing blocks of the MN are configured to process a radio communications protocol stack.

When both, the signal processing blocks of the BS and the signal processing blocks of the MN are able to process a radio communications protocol stack, the processing can be flexibly performed by either the BS or the MN depending on the traffic situation.

In a fifth possible implementation form of the radio communications system according to any of the preceding implementation forms of the first aspect, the BS and the MN are configured to switch their dispatching means such that protocol layers of the radio communications protocol stack are selectively processed by the BS or by the MN.

Interworking of BS and MN can be flexibly selected in order to optimize the system performance.

In a sixth possible implementation form of the radio communications system according to the fifth implementation form of the first aspect, a part of a lower layer processing of the radio communications protocol stack is processed by the BS and a complementary part of the lower layer processing is processed by the MN or vice versa.

The lower layer processing of the radio protocol can thus be partitioned between the MN and the BS thereby increasing the efficiency of the system.

In a seventh possible implementation form of the radio communications system according to the fifth implementation form of the first aspect, a lower layer processing of the radio communications protocol stack is either processed by the BS or processed by the MN or vice versa.

The radio communications system can thus implement a DBS mode processing and an SBS mode processing and is thereby compliant to existing processing solutions.

In an eighth possible implementation form of the radio communications system according to any of the fourth to seventh implementation forms of the first aspect, the BS and the MN are configured to switch off signal processing blocks that are not used for processing the protocol layer of the radio communications protocol stack.

By switching off components which are not used, the radio communications system is efficient in power.

In a ninth possible implementation form of the radio communications system according to the first aspect as such or according to any of the preceding implementation forms of the first aspect, the BS comprises a FSBS according to Small Cell Forum standardization or a DBS according to CPRI standardization.

That means, the radio communications system is compliant to the Small Cell Forum Standardization.

In a tenth possible implementation form of the radio communications system according to the first aspect as such or according to any of the preceding implementation forms of the first aspect, the MN and the BS are configured to exchange a test sequence for determining radio network and backhaul network parameters, the parameters describing a coupling of the BS to the MN, wherein the radio network and backhaul network parameters comprise at least one of the following: a part representing quality of service on the air interface, comprising interference situation information in UL and DL at receiver side, in particular per user in a radio cell of the radio communications system, and a part representing quality of service in the backhaul network, comprising at least one of the following: a DL data rate between the MN and the BS, an UL data rate between the BS and the MN, a DL BW between the MN and the BS, an UL BW between the BS and the MN, a DL delay time between the MN and the BS, an UL delay time between the BS and the MN, a DL jitter between the MN and the BS, an UL jitter between the BS and the MN, and a backhaul network technology, in particular SDH, PDH, ATM and IP.

That means, the data tapping is aware of the performance of the network backend and especially the backhaul network connected to the cells. The system is able to react on possible decrease in QoE of the end user in order to improve the end user's quality of experience.

Depending on the radio situation the MN chooses different data tappings and corresponding signal processing modes, e.g. to realize the classical distributed radio architecture (the first interface, CPRI base is chosen). In situations, where central IC does not improve network performance (RS IC), it can be switched off by choosing the classical line interface. In this case, the line interface connects directly to the CN functions (GGSN, MSC . . . ).

The MN is thus adapted to the limits of the backhaul, e.g. BW, delay and jitter.

In an eleventh possible implementation form of the radio communications system according to the tenth implementation form of the first aspect, the MN and the BS are configured to measure the radio network and backhaul network parameters based on the test sequence.

The test sequence may be used for easy determining radio network and backhaul network parameters. Thus, by using the test sequence, a coupling of the BS to the MN can be efficiently determined.

In a twelfth possible implementation form of the radio communications system according to the eleventh implementation form of the first aspect, the MN and the BS are configured to measure the radio network and backhaul network parameters for different switching modes of the dispatching means of the MN and the dispatching means of the BS.

The test sequence can be used for measuring all configurations of both dispatching means, thereby receiving information about the system with respect to backhaul characteristics.

In a thirteenth possible implementation form of the radio communications system according to the twelfth implementation form of the first aspect, the radio communications system comprises a lookup table, the lookup table comprising the measured radio network and backhaul network parameters for the different switching modes.

In the lookup table the information can be efficiently stored. It is easy to retrieve the information about backhaul characteristics of the system and to adjust the dispatching means based on that information.

In a fourteenth possible implementation form of the radio communications system according to the thirteenth implementation form of the first aspect, the radio communications system is configured to select one of the switching modes of the dispatching means of the MN and the dispatching means of the BS based on requirements for the radio network and backhaul network parameters.

Optimum radio network configuration can be achieved by a comparison of required values for jitter, BW and delay with possible values for jitter, BW and delay depending on the configuration of the dispatching means. The hardware and software costs can be minimized when adjusting the most efficient dispatching means configuration.

In a fifteenth possible implementation form of the radio communications system according to the first aspect as such or according to any of the preceding implementation forms of the first aspect, the MN comprises a SON coordination unit configured to manage configuration information based on data tapping and corresponding signal processing options for switching the dispatching means of the MN and the dispatching means of the BS.

Connecting data tapping and signal processing options to the SON coordinator/functions is used for (self)-optimizing the system. The Cfgs can be managed by the SON coordinator. It is aware of the traffic and interference situation of all small cells and automatically changes the data tapping and signal processing via the dispatchers. In this way, the radio communications system is optimized.

According to a second aspect, the invention relates to a MN comprising a line of signal processing blocks and dispatching means switchable to data taps of the line of signal processing blocks, wherein the MN is configured to exchange configuration information with a BS and configured to switch the dispatching means of the MN in correspondence to dispatching means of the BS.

Due to the flexible data tapping and signal processing, the MN provides a flexible architecture with high spectral efficiency for high and for low end-user traffic loads. The MN can be flexibly connected to a BS with respect to different layers of a radio protocol stack.

According to a third aspect, the invention relates to a BS comprising a line of signal processing blocks and dispatching means switchable to data taps of the line of signal processing blocks, wherein the BS is configured to exchange configuration information with a MN and configured to switch the dispatching means of the BS in correspondence to dispatching means of the MN.

Due to the flexible data tapping and corresponding signal processing, the BS provides a flexible architecture with high spectral efficiency for high and for low end-user traffic loads. The BS, e.g. a small BS, can be flexibly connected to a MN with respect to different layers of a radio protocol.

In a first possible implementation form of the BS according to the third aspect, the BS comprises a FSBS according to Small Cell Forum standardization or a DBS according to CPRI standardization.

In a second possible implementation form of the BS according to the third aspect as such or according to the first implementation form of the third aspect, the switching of the dispatching means of the BS in correspondence to the dispatching means of the MN is based on profiling information provided by the BS.

According to a fourth aspect, the invention relates to a method for processing a radio communications system comprising a MN and a BS, the MN comprising a line of signal processing blocks and dispatching means switchable to data taps of the line of signal processing blocks, and the BS comprising a line of signal processing blocks and dispatching means switchable to data taps of the line of signal processing blocks, the method comprising: exchanging configuration information between the MN and the BS; and switching the dispatching means of the MN in correspondence to the dispatching means of the BS.

Due to the flexible data tapping and signal processing, the method provides a flexible radio processing with high spectral efficiency for high and for low end-user traffic loads.

According to a fifth aspect, the invention relates to a method for processing a radio communications system comprising a MN and a BS, the MN comprising a line of signal processing blocks and dispatching means switchable to data taps of the line of signal processing blocks, and the BS comprising a line of signal processing blocks and dispatching means switchable to data taps of the line of signal processing blocks, the method comprising: exchanging configuration information between the MN and the BS by an exchanging entity; and switching the dispatching means of the MN in correspondence to the dispatching means of the BS by a switching entity.

The methods described herein may be implemented as software in a DSP, in a micro-controller or in any other side-processor or as hardware circuit within an ASIC.

The invention can be implemented in digital electronic circuitry, or in computer hardware, firmware, software, or in combinations thereof.

These and other aspects of the invention will be apparent from the implementation forms described below.

BRIEF DESCRIPTION OF THE DRAWINGS

Further embodiments of the invention will be described with respect to the following figures, in which.

DETAILED DESCRIPTION

Figure 1:
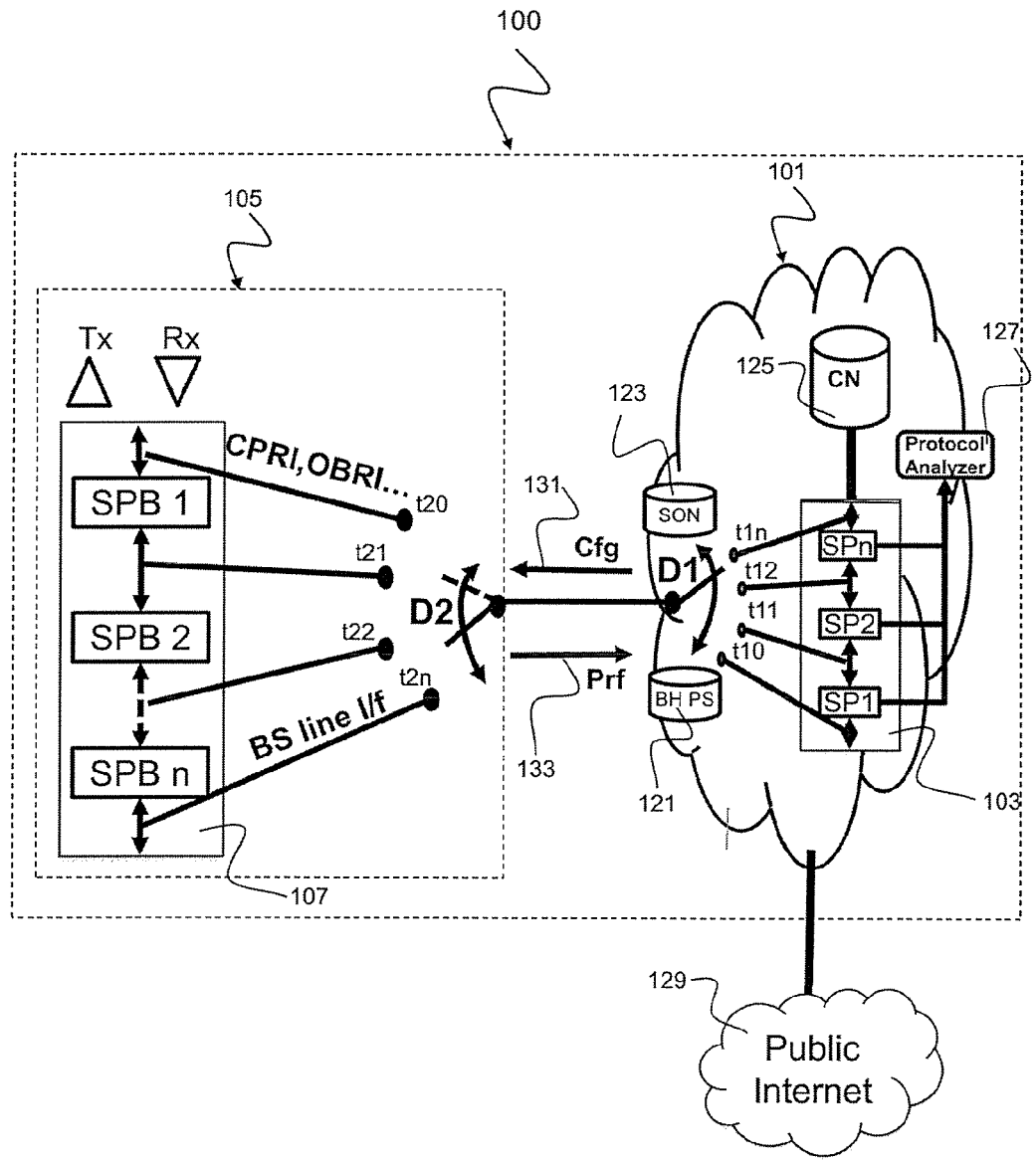
FIG. 1 shows a block diagram of a radio communications system implementing an ARAP according to an implementation form.

FIG. 1 shows a block diagram of a radio communications system 100 implementing an ARAP according to an implementation form.

The radio communications system 100 comprises an MN 101 and a BS 105. The MN 101 comprises a line of SPBs SP1, SP2, SPn and dispatching means D1 switchable to taps t10, t11, t12 and tin of the line of signal processing blocks SP1, SP2 and SPn. The BS 105 comprises a line of signal processing blocks SPB1, SPB2, SPBn and dispatching means D2 switchable to data taps t20, t21, t22 and t2n of the line of signal processing blocks SPB1, SPB2 and SPBn. The dispatching means D1 is also called front-end dispatching means and the dispatching means D2 is also called back-end dispatching means.

The dispatching means D1 is switchable to data taps t10, t11, t12 and t1n of the line of signal processing blocks SP1, SP2 and SPn. That means, by switching to a data tap, the corresponding signal processing implemented in the signal processing blocks behind the data tap is performed. For example, switching the dispatching means D1 to data tap t10 results in implementation of signal processing of SP1 to SPn; switching the dispatching means D1 to data tap t11 results in implementation of signal processing of SP2 to SPn; switching the dispatching means D1 to data tap t12 results in implementation of signal processing of SPn; switching the dispatching means D1 to data tap t1n results in data forwarding without processing the signal processing blocks SP1, SP2 to SPn.

The dispatching means D2 is switchable to data taps t20, t21, t22 and t2n of the line of signal processing blocks SPB1, SPB2 and SPBn. That means, by switching to a data tap, the corresponding signal processing implemented in the signal processing blocks behind the data tap is performed. For example, switching the dispatching means D2 to data tap t21 results in implementation of signal processing of SPB1; switching the dispatching means D2 to data tap t22 results in implementation of signal processing of SPB1 and SPB2; switching the dispatching means D2 to data tap t2n results in implementation of signal processing of SPB1 to SPBn; while switching the dispatching means D2 to data tap t20 results in data forwarding without processing the signal processing blocks SPB1 to SPBn.

When dispatching means D2 is switched to data tap t21 and dispatching means D1 is switched to data tap t11, the BS 105 processes the signal processing block SPB1 and the MN 101 processes the signal processing blocks SP2 to SPn, thereby processing a complete radio protocol stack where layers of this radio protocol stack can be implemented by the signal processing blocks SPB1 to SPBn and SP1 to SPn.

The BS 105 further comprises a transceiver Tx, Rx for transmitting/receiving signals to/from a mobile device. The MN 101 and the BS 105 are configured to exchange configuration information 131 in order to switch the dispatching means D1 of the MN 101 in correspondence to the dispatching means D2 of the BS 105. The dispatching means D1, D2 can be realized as hardware units or as software units. The dispatching means D1, D2 can also be realized by a processor. They can be implemented, for example, as software in a DSP, in a micro-controller or in any other side-processor or as hardware circuit within an ASIC. The dispatching means D1, D2 can be implemented in digital electronic circuitry, or in computer hardware, firmware, software, or in combinations thereof.

The radio communications system 100 provides flexible data tapping, i.e. accessing the receive signal RX or the transmit signal TX with respect to an interface to that signal. Interfaces to these signals can be CPRI or OBRI interfaces or a BS line interface or other ones not specified in FIG. 1 between the signal processing blocks SPB1, SPB2, ..., SPBn. Flexible data tapping specifies the flexible accessing the signal. In conventional radio network architectures no such flexible data tapping is specified. The signal is either accessed by the CPRI, OBRI interface or by the BS line interface but not by interfaces in between as the line of signal processing blocks SPB1, SPB2 and SPBn as depicted by FIG. 1 is implemented as a single internal processing block not accessible from the outside.

The profiling information 133 determines an actual chosen data tapping and corresponding signal processing of the data taps t10, t11, t12, t1n, t20, t21, t22, t2n. In an implementation form, the profiling information 133 comprises a profiling part representing quality of service on an air interface of the radio communications system 100. In an implementation form, the profiling information 133 comprises a profiling part representing quality of service in a backhaul network. According to an implementation form of the profiling part representing quality of service on an air interface of the radio communications system 100, the profiling part comprises interference situation information in up and DL at receiver side, in particular per user in a radio cell of the radio communications system. According to an implementation form of the profiling part representing quality of service in a backhaul network, the profiling part comprises a number of supported frequency blocks, available radio technologies, a number of supported signal processing blocks, and/or provisioned backhaul standard and/or technologies, in particular SDH, TDM, ATM and IP.

In an implementation form, the ARAP implements the BS 105 as SBS in combination with a RS 103 in the MN 101. Both the RS 103 and the dispatching means D1 are arranged in the MN 101. The line of signal processing blocks SP1, SP2 and SPn are arranged in the RS 103. For the SBS 105, an RRH 107 and the dispatching means D2 are arranged in the SBS 105. The line of signal processing blocks SPB1, SPB2 and SPBn are arranged in the RRH 107 of the SBS 105. The MN 101 further comprises a SON coordinator 123, a BH PS 121, a protocol analyzer 127 and a CN 125. In an implementation, the MN 101 is connected to the public internet 129.

The implementation allows flexible data tapping and corresponding signal processing both in the SBS and in the corresponding RS. The implementation profits from the fact that the prices of hardware components for L1/L2/L3 processing will be dramatically reduced in future. In other words, the overall cost impact when leaving these blocks "duplicated" can be considered as negligible in longer term. On the other hand, as it will be shown in the sequel, the adaptation possibility introduced by such an implementation brings significant benefits compared with the conventional architectures such as DBS or SBS. Essentially, by utilizing the presented implementation, the advantages of both standard approaches, the high spectrum efficiency of the centralized solution and the lower backhaul capacity requirement of the SBS, can be harvested in parallel. In the process of setting up the network, the FSBS will send its profiles 133 to the main MN 101. This profile is coined as FSBS profile 133. The profile data 133 may include one or more of the following items: the number of supported frequency blocks, the available radio technologies and the number of supported signal processing blocks (SPBs).

The dispatchers (D1, D2) are parts of the SBS 105 and the MN 101, respectively. The Cfgs 131 are sent by the MN configuration management to the front-end dispatcher D1 and the back-end dispatcher D2. The Cfgs 131 are managed by the SON coordinator 123. The SON coordinator 123 is aware of the traffic and interference situation of all small cells and automatically changes the data tapping and corresponding signal processing via the dispatchers D1 and D2. The configuration policies are stored in the BHPS 121 and are defined by the business aspects of the mobile operator or backhaul provider. For example, the average backhaul BW might be limited within certain time frames. The dispatcher time granularity can range from milliseconds (packed based) to hours. In principle, standard synchronization procedures, i.e. handover, buffering, etc. can be utilized. The new users in the system are assigned the appropriate mode according to the interference situation, e.g., CPRI mode for performing optimal centralized processing and complete IC. The existing users in the system keep their modes smooth at first. No service is interrupted, which means that in practice one can wait for the termination of the session or for the user leaving the system, before switching to another mode. Also, switching from one mode to another is realized in a "soft" way, having the old mode not interrupted until the connection over the new one is completely built. For energy saving reasons, in an implementation, the SPBs which are not used are switched off. In an implementation, depending on the selected mode, signals of L1, L2, and/or L3 processing are available at RS and are passed through a centralized protocol analyzer 127 for optimization purposes. In an implementation, network optimizers manually select the data tapping and signal processing mode for a BS of interest. Tapping for monitoring is denoted as the dotted line of dispatcher switch in FIG. 1. Hence, multiple streams can be then provided by FSBS 105 to MN 101. Depending on the radio situation, the MN 101 chooses different data tapping and signal processing modes. In the sequel, the two extreme modes of interest, which correspond to the DBS and SBS architectures are described.

ARAP provides flexible data tapping and signal processing in small BSs and flexible data processing in the MN. ARAP includes dispatchers in FSBS and MN. Switching different data taps can be initiated by different configuration messages. FSBS profiles can be extended by tapping options supported by FSBS hardware. The policy server can be used for backhaul fulfilling business options. By connecting data tapping and signal processing options to the SON coordinator/functions the system is (self)-optimizing. By using a centralized protocol analyzer for L1/L2/L3 processing, parallel streams are supported for monitoring of SPBs.

In FIG. 1, the BS 105 comprises a CPRI interface "CPRI". The dispatching means D1 can be coupled to the CPRI interface. The CPRI is an initiative to define a publicly available specification that standardizes the protocol interface between the REC and the RE in wireless BSs. This allows interoperability of equipment from different vendors, and preserves the software investment made by wireless service providers. Conventional BSs are located adjacent to the antenna in a small but at the base of the antenna tower. Finding suitable sites can be a challenge because of the footprint required for the hut, the need for structural reinforcement of rooftops, and the availability of both primary and backup power sources. CPRI allows the use of a distributed architecture where BSs, containing the REC, are connected to RRHs via lossless fiber links that carry the CPRI data. This architecture reduces costs for service providers because only the RRHs containing the RE need to be situated in environmentally challenging locations. The BSs can be centrally located in less challenging locations where footprint, climate, and availability of power are more easily managed.

In FIG. 1, the BS 105 comprises an OBRI interface "OBRI". The dispatching means D1 can be coupled to the OBRI interface. The OBRI interface is standardized by the ETSI ORI Industry Specification Group. Use of distributed RE can lead to significant cost savings for a mobile operator, especially when the connections are by fiber, as well as offering a greater level of flexibility in network design and deployment. This can also help reduce the visual impact of the installations. In such schemes, further benefits can be realized by the establishment of an open interface between the BS and the RRH. An open interface enables operators to source the BSs and remote equipment from different vendors, helping to avoid "lock-in" to a specific supplier and permitting a more rapid response to operational demands and market opportunities. Additionally, such an interface allows flexibility in equipment upgrades, as just one part of an implementation may be replaced, rather than both ends, and valuable investments can thus be maintained over a longer depreciation period. Standardized interfaces also facilitate testing and troubleshooting, and reduce development effort for test equipment suppliers.

In FIG. 1, the BS 105 comprises a BS line interface "BS line". The BS line interface is responsible for handling traffic and signaling between a mobile phone and the network switching subsystem. The BS line interface carries out transcoding of speech channels, allocation of radio channels to mobile phones, paging, transmission and reception over the air interface and many other tasks related to the radio network.

Figure 2:
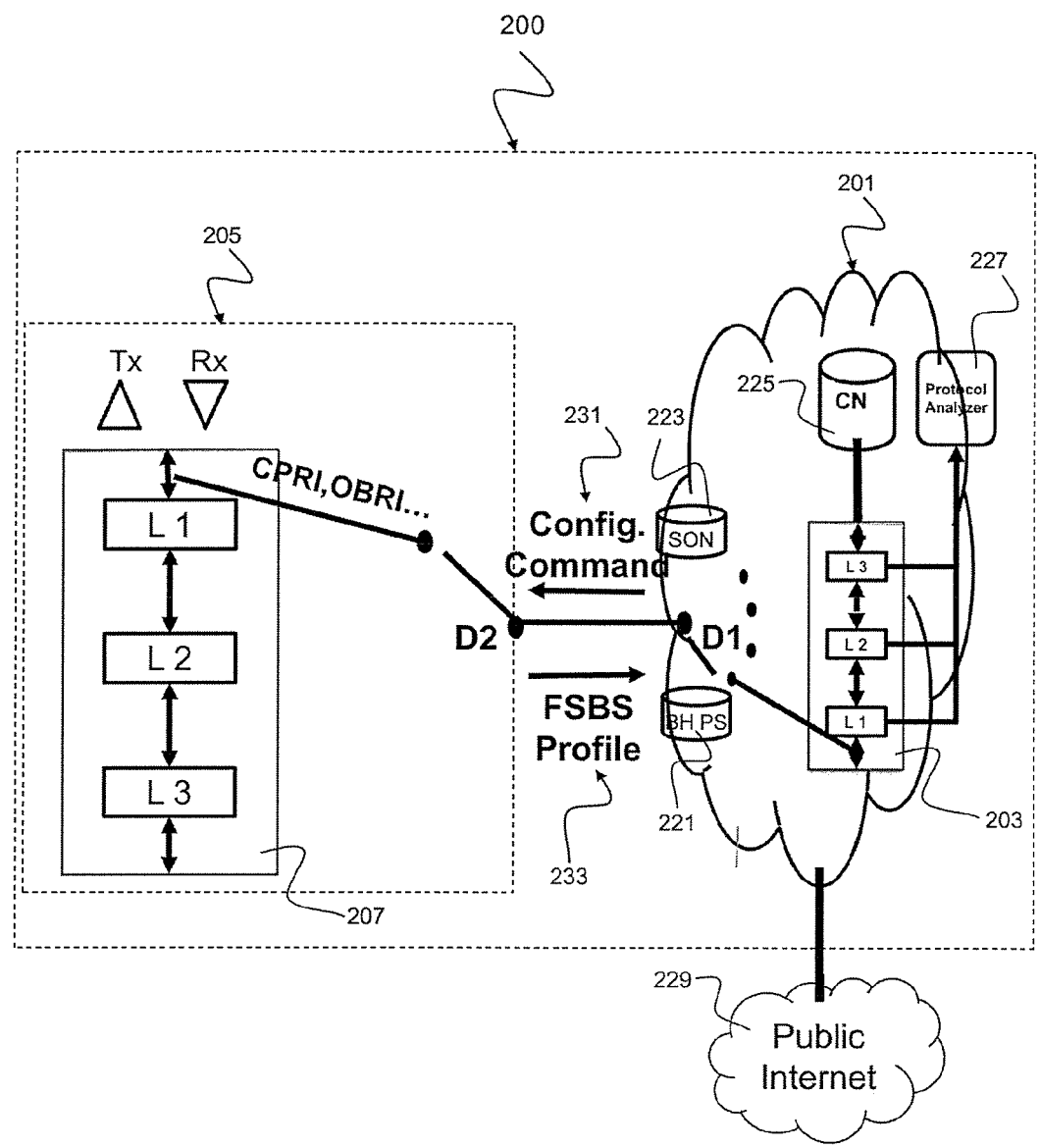
FIG. 2 shows a block diagram of a radio communications system operating in "DBS mode" according to an implementation form.

FIG. 2 shows a block diagram of a radio communications system 200 operating in "DBS mode" according to an implementation form.

The radio communications system 200 comprises an MN 201 and a BS 205. The MN 201 comprises a line of signal processing blocks L1, L2, L3 and dispatching means D1 switchable to taps and corresponding signal processing of the line of signal processing blocks L1, L2, L3. The BS 205 comprises a line of signal processing blocks L1, L2, L3 and dispatching means D2 switchable to taps of the line of signal processing blocks L1, L2, L3. FIG. 2 shows the situation where tapping is performed before the L1 block of the BS 205. The BS 205 further comprises a transceiver Tx, Rx for transmitting/receiving signals to/from a mobile device. The MN 201 and the BS 205 are configured to exchange configuration information 231 and profiling information 233 in order to switch the dispatching means D1 of the MN 201 in correspondence to the dispatching means D2 of the BS 205.

The radio communications system 200 may correspond to the radio communications system 100 as described with respect to FIG. 1 when tapping is performed between the transceiver Tx, Rx and the L1 processing block denoted as SPB1 in FIG. 1 and L1 in FIG. 2.

If tapping is performed before the L1 block, the distributed radio architecture is realized. In this case, the CPRI interface for the backhaul is chosen, and complete L1/L2/L3 processing is done on the RS side 203. This is a desired option in the interference limited scenarios. The supporting functions like protocol analyzers 227 for L1/L2/L3 signal processing are also implemented in the RS 203. These functions can be used "on demand" for radio network optimization. This is an economically more feasible solution compared to installing additional probes distributed in the network.

Data tapping depicted in FIG. 2 is also called "DBS mode" data tapping as it is compliant to a BS operating according to a DBS concept. DBSs expand deployment options by using two components, a BBU containing the digital assets, and a separate RRH containing the radio frequency elements. This modular design optimizes available space and allows the main components of a BS to be installed separately, within the same site or several miles apart. As a result, it enables a wider variety of configurations from micro to macro coverage with various capacity levels. By gaining these additional options for positioning BS equipment, time can be saved on site acquisition, lower installation and site costs and improved performance can be realized.

In FIG. 2, the BS 205 comprises a CPRI interface "CPRI" and/or an OBRI interface "OBRI". These interfaces correspond to the respective interfaces as described above with respect to FIG. 1.

Figure 3:
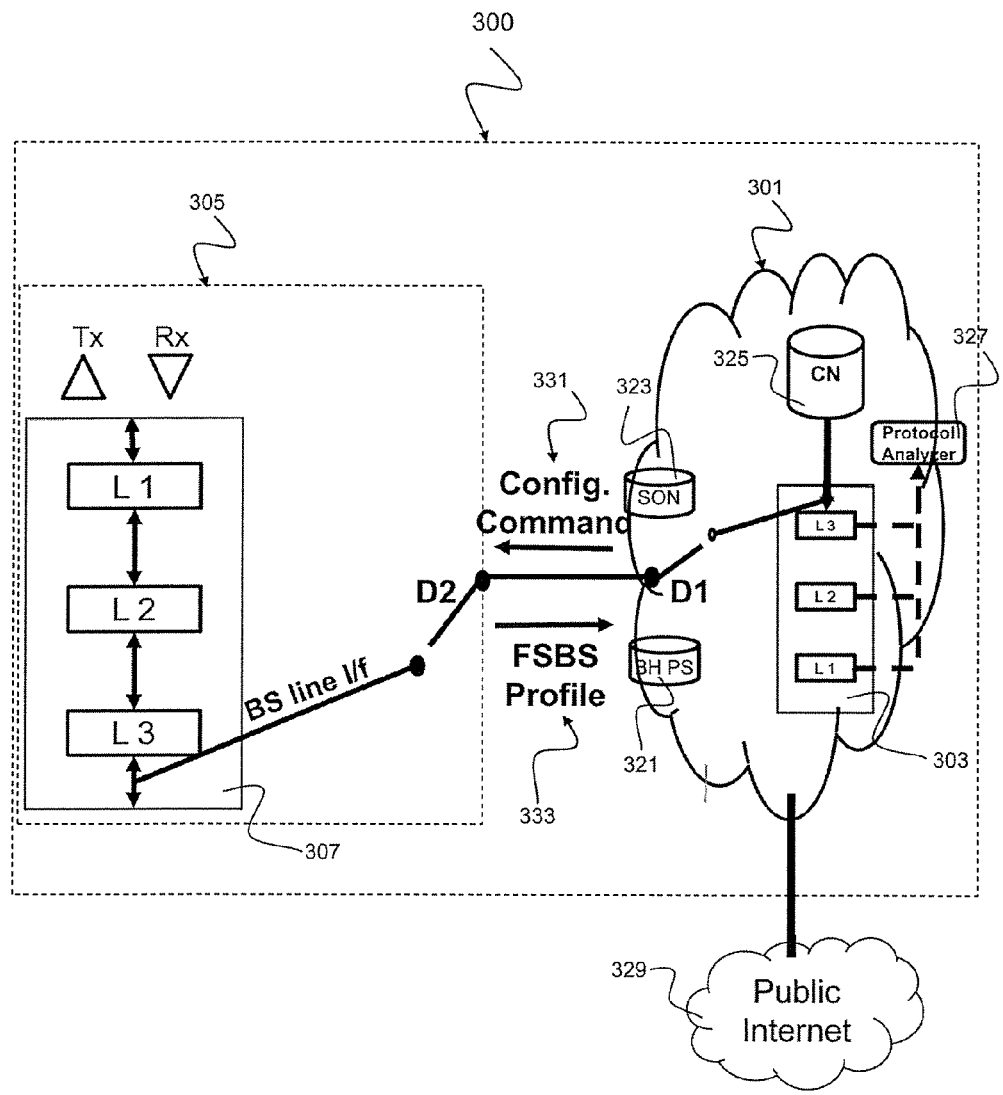
FIG. 3 shows a block diagram of a radio communications system operating in "SBS mode" according to an implementation form.

FIG. 3 shows a block diagram of a radio communications system 300 operating in "SBS mode" according to an implementation form.

The radio communications system 300 comprises a MN 301 and a BS 305. The MN 301 comprises a line of signal processing blocks L1, L2, L3 and dispatching means D1 switchable to taps and corresponding signal processing of the line of signal processing blocks L1, L2, L3. The BS 305 comprises a line of signal processing blocks L1, L2, L3 and dispatching means D2 switchable to taps and corresponding signal processing of the line of signal processing blocks L1, L2, L3. The BS 305 further comprises a transceiver Tx, Rx for transmitting/receiving signals to/from a mobile device. The MN 301 and the BS 305 are configured to exchange Cfg information 331 and profiling information 333 in order to switch the dispatching means D1 of the MN 301 in correspondence to the dispatching means D2 of the BS 305.

In the MN 301, the line of signal processing blocks L1, L2 and L3 are arranged in an RS 303. An RRH 307 and the dispatching means D2 are arranged in the BS 305, In the BS 305, the line of signal processing blocks L1, L2 and L3 are arranged in the RRH 307 of the BS 305. The MN 301 further comprises a SON coordinator 323, a BH PS 321, a protocol analyzer 327 and a CN 325. In an implementation, the MN 101 is connected to the public internet 329.

The radio communications system 300 may correspond to the radio communications system 100 as described with respect to FIG. 1 when tapping is performed behind the L1, L2 and L3 processing blocks denoted as SPB1, SPB2 and SPB3 in FIG. 1 and L1, L2, L3 in FIG. 3.

In situations, where central IC does not improve network performance (RS IC), the centralized processing can be switched off by choosing the classical BS line interface. This situation is depicted in FIG. 3. In this case, the line interface connects directly to the CN functions 325, e.g. GGSN, MSC, etc., and L1/L2/L3 processing is done at the SBS 305. A number of options between these two modes are of significant practical interest. The mixed mode operations enable macro diversity to some users using the RS processing, while the others can be fully decoded in the local SBS.

In FIG. 3, the BS 305 comprises a BS line interface "BS line I/f". This interface corresponds to the BS line interface "BS line I/f" as described above with respect to FIG. 1.

Figure 4:
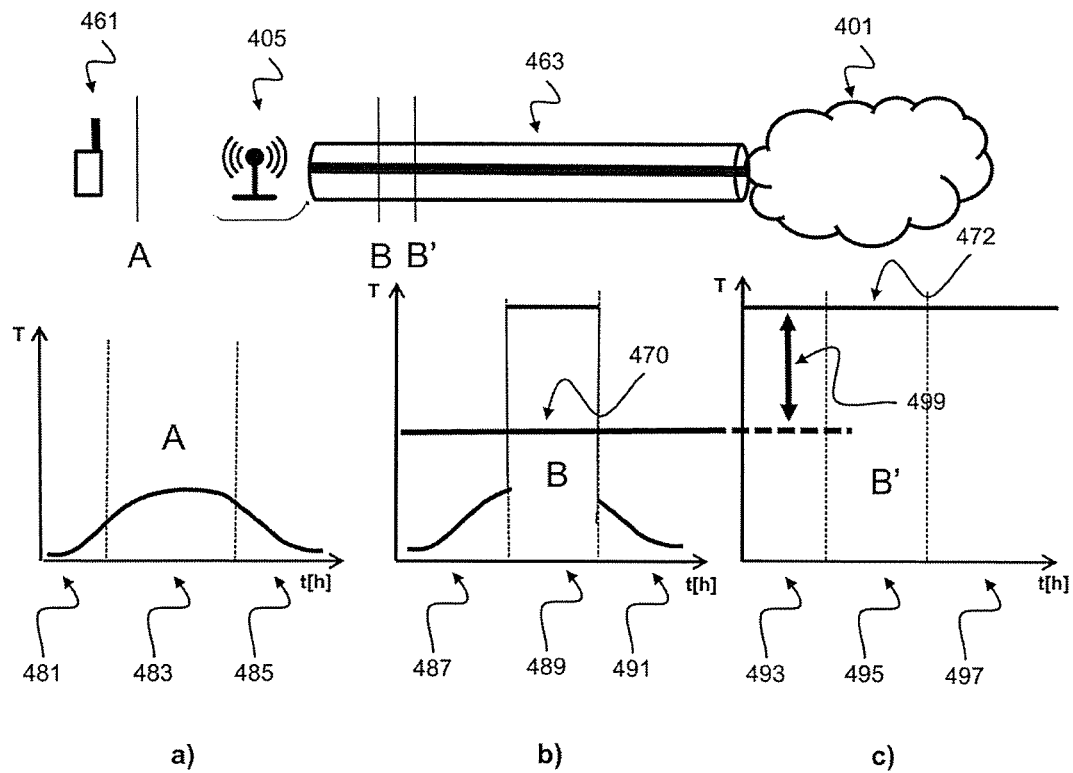
FIG. 4 shows a performance diagram of the ARAP according to an implementation.

FIG. 4 shows a performance diagram of a radio communications system according to an implementation. A mobile device 461 transmits via the A-interface to a BS 405 which transmits backhaul traffic B or B' depending on its configuration to a MN 401. The traffic T over time t in hours h at the A interface and the backhaul traffic B and B' are depicted in FIGS. 4a, 4b and 4c.

The benefit of ARAP is to combine adaptively the benefits of the known SBS and DBS approaches using a single architecture. That means that the average backhaul capacity is reduced compared to the DBS, while the DBS mode will be kept for highest spectrum efficiency in interference challenging scenarios. An illustration of this main advantage over the conventional schemes is given in FIG. 4. FIG. 4a shows a distribution of the actual user traffic T over the air-interface A. During a first time section 481, IC is switched off, during a second time section 483, IC is switched on and during a third time section 485, IC is again switched off.

FIG. 4b illustrates the backhaul traffic demand B (data rate) to support this user traffic with ARAP. During a first time section 487, IC is switched off, during a second time section 489, IC is switched on and during a third time section 491, IC is again switched off. During IC switched-off, the backhaul traffic is at a level comparable to the situation described in FIG. 4a, during IC switched-on, the backhaul traffic approaches an increased level 472 compared to an average traffic level 470. Thus, more backhaul capacity is needed in high traffic periods when the IC is necessary to provide satisfactory QoS/QoE. A gain 499 is achieved between the average traffic level 470 realized by the ARAP depicted in FIG. 4b and the increased traffic level 472 describing the DBS architecture depicted in FIG. 4c.

FIG. 4c illustrates the backhaul traffic demand B' for the DBS architecture. During a first time section 493, IC is switched off, during a second time section 495, IC is switched on and during a third time section 497, IC is again switched off. The backhaul traffic demand B' is constantly high at the increased level 472 equal to the "IC on" scenario in ARAP, shown in FIG. 4b, which is induced by system design. Clearly, the average value 470 for backhaul data rates in the ARAP are much lower compared to the DBS architecture. Therefore, the MNO using the ARAP can minimize the traffic demand for the backhaul provider and apply for better price conditions.

The flexibility provided by the different tapping and corresponding signal processing modes provides various additional performance benefits, that several spectrum efficiency improvements by new radio features. For example, tapping after L1 in FSBS allows implementation of fast scheduling for joint transmission to one UE over adjacent/overlapping cells (super-MAC, signal processing in the MN). On the other hand, the backhaul provider, who has massive investments in the fiber network, can prevent extreme price erosions by "flat fees". The pricing scheme "capacity on demand/pay per use" can be realized. Other CAPEX/OPEX positions in the MN as well as in the fiber backhaul/backbone network can also be reduced due to smaller hardware footprint and, consequently, reduction of power, site space, etc.

Figure 5:
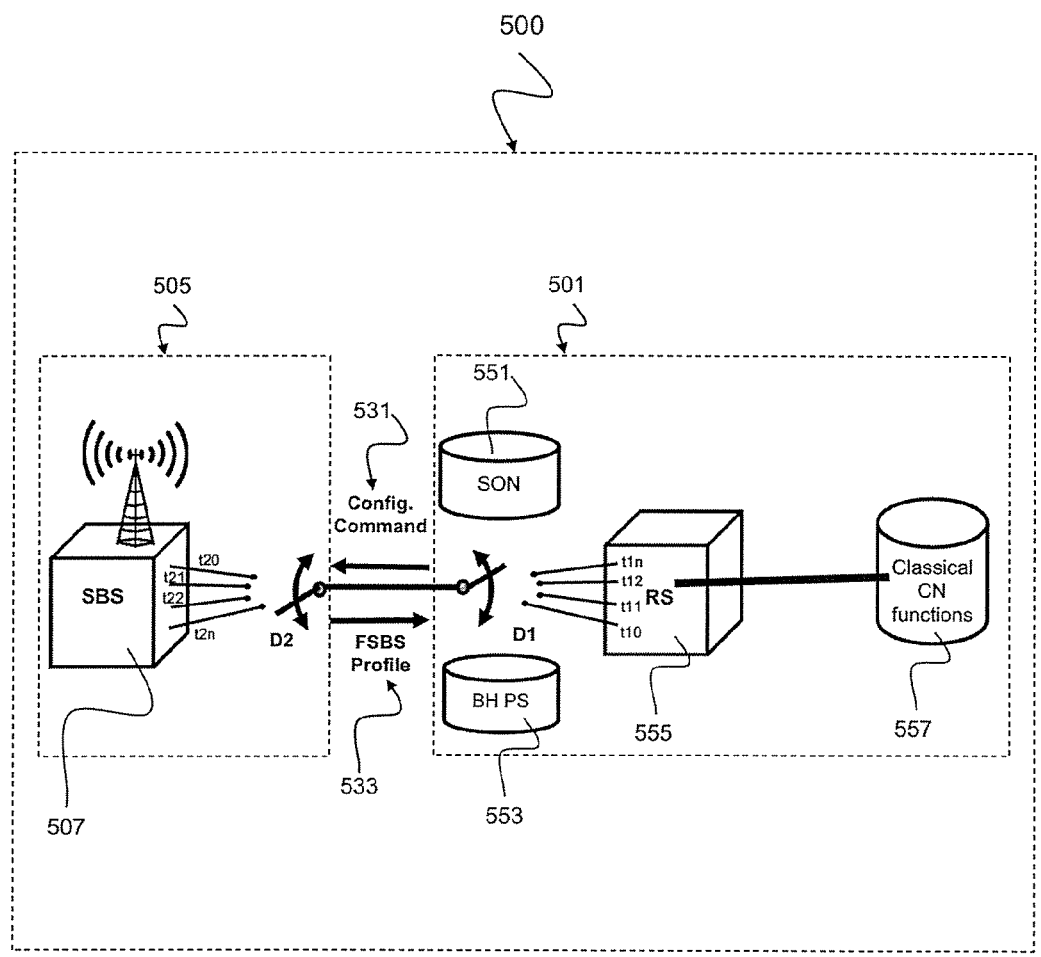
FIG. 5 shows a block diagram of a radio communications system implementing an ARAP comprising BARC according to an implementation.

FIG. 5 shows a block diagram of a radio communications system implementing an ARAP comprising BARC according to an implementation form.

The radio communications system 500 comprises a MN 501 and a BS 505. The MN 501 comprises an RS 555 with a line of signal processing blocks and further comprises dispatching means D1 switchable to taps t10, t11, t12, t1n of the line of signal processing blocks. The BS 505 comprises a line of signal processing blocks and further comprises dispatching means D2 switchable to taps t20, t21, t22, t2n of the line of signal processing blocks. In the process of setting up the network, the BS 505 will send its profiles 533 to the MN 501. The profile data 533 may include one or more of the following items: the number of supported frequency blocks, the available radio technologies and the number of supported signal processing blocks (SPBs). The MN 501 and the BS 505 are configured to exchange configuration information 531 in order to switch the dispatching means D1 of the MN 501 in correspondence to the dispatching means D2 of the BS 505. The BS 505 comprises a small BS 507 implementing the line of signal processing blocks.

The MN 501 further comprises a SON coordinator 551, a BH PS 553, a RS 555 and a CN 557 for performing classical CN functions.

The dispatching means D1, D2 can be realized as hardware units, i.e. in hardware, or as software units, i.e. in software. The dispatching means D1, D2 can also be realized by a processor. They can be implemented, for example, as software in a DSP, in a micro-controller or in any other side-processor or as hardware circuit within an ASIC. The dispatching means D1, D2 can be implemented in digital electronic circuitry, or in computer hardware, firmware, software, or in combinations thereof. The MN 501 may correspond to the MN 101 described with respect to FIG. 1. The BS 505 may correspond to the BS 105 described with respect to FIG. 1.

The MN 501 and the BS 505 are configured to exchange a test sequence for determining network parameters describing a coupling of the BS 505 to the MN 501. The network parameters may comprise a data rate between the MN 501 and the BS 505 or vice versa, a BW between the BS 505 and the MN 501 or vice versa, a delay time between the MN 501 and the BS 505 or vice versa and/or a jitter between the MN 501 and the BS 505 or vice versa. The MN 501 and the BS 505 are configured to switch their dispatching means D1, D2 based on the network parameters.

The test sequence is used for determining radio network and backhaul network parameters, the parameters describing a coupling of the BS 105 to the MN 101. In an implementation form, the radio network and backhaul network parameters comprise a part representing quality of service on the air interface. In an implementation form, the radio network and backhaul network parameters comprise a part representing quality of service in the backhaul network. According to an implementation form, the part representing quality of service on the air interface may comprise interference situation information in up and DL at the receiver side, in particular per user in a radio cell of the radio communications system. According to an implementation form, the part representing quality of service in the backhaul network may comprise a DL data rate between the MN 101 and the BS 105, an UL data rate between the BS 105 and the MN 101, a DL BW between the MN 101 and the BS 105, an UL BW between the BS 105 and the MN 101, a DL delay time between the MN 101 and the BS 105, an UL delay time between the BS 105 and the MN 101, a DL jitter between the MN 101 and the BS 105, an UL jitter between the BS 105 and the MN 101, and/or a backhaul network technology, in particular SDH, PDH, ATM and IP.

A radio communications system implementing an ARAP comprising BARC thus provides data processing based on the backhaul quality, e.g. on quality parameters like BW, delay, jitter, etc. In an implementation, the measurement of maximum values for BW, delay and jitter is separated for UL/DL in the backhaul. In an implementation, a look up table is used for operator or hardware defined data tapping (SBS profile) and processing mode including the needed BW and maximum allowed delay/jitter. In an implementation, suitable backhaul modes are selected based on the measured values for BW, delay and/or jitter. In an implementation, suitable backhaul modes are selected based on the look-up table.

Figure 6:
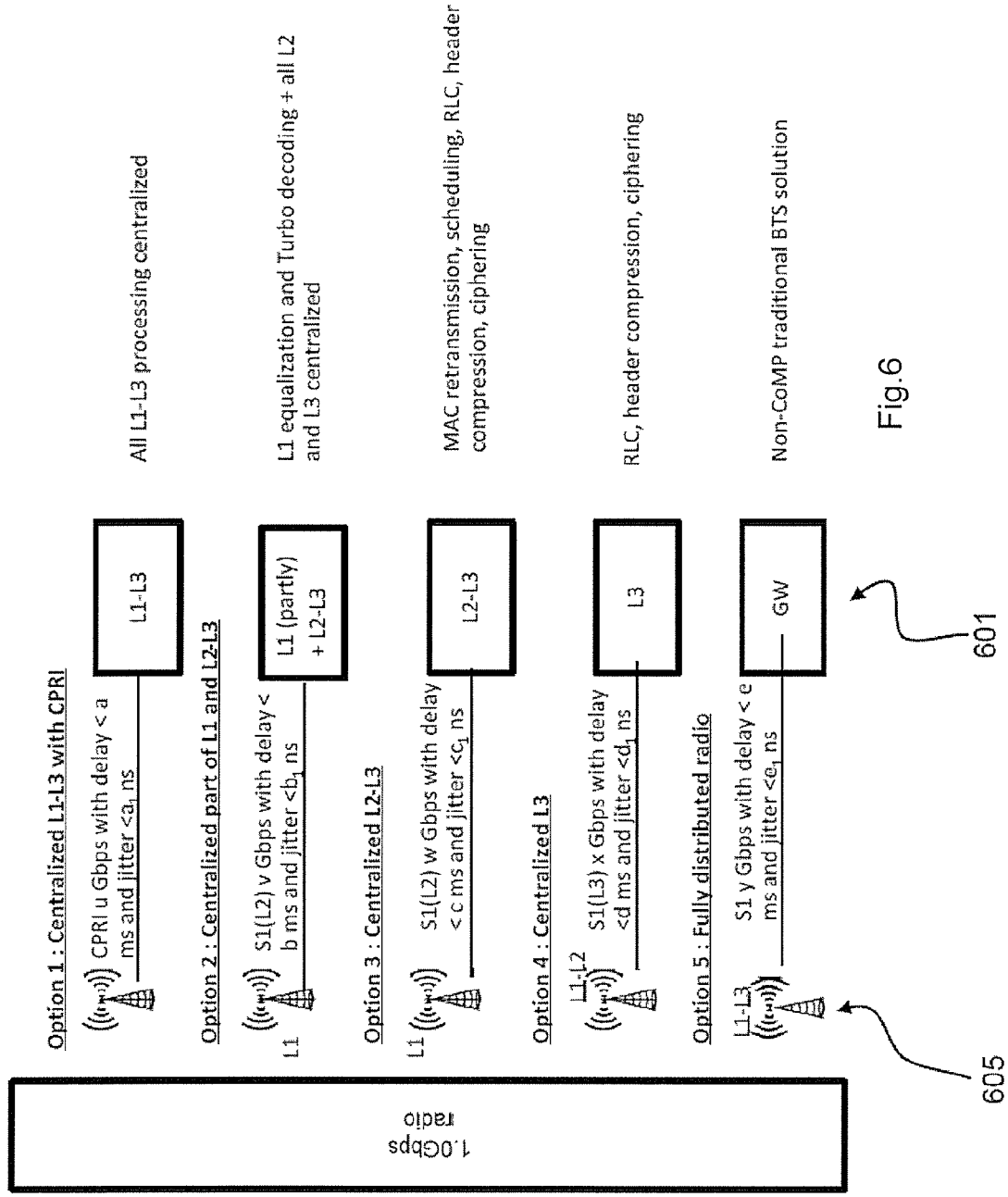
FIG. 6 shows a schematic diagram illustrating configuration options for a radio communications system comprising BARC according to an implementation.

FIG. 6 shows a schematic diagram illustrating configuration options for a radio communications system comprising BARC according to an implementation. Five different options (option 1 to option 5) are depicted which are applicable for single UE's (heterogeneous), different UL/DL options, or complete SBS for all UE's (homogenous).

Option 1 describes centralized L1-L3 processing with CPRI with CPRI u Gbps with delay <a ms and jitter <$a_1$ ns. All L1-L3 processing is centralized. L1/L2/L3 processing is performed by Radio Network 601; Small BS 605 does not perform L1/L2/L3 processing.

Option 2 describes centralized part of L1 and L2-L3 processing with S1(L2) v Gbps with delay <b ms and jitter <$b_1$ ns. L1 equalization and Turbo decoding, and all L2 and L3 processing are centralized. L2/L3 processing and parts of L1 processing is performed by Radio Network 601; L1 processing is performed by Small BS 605.

Option 3 describes centralized L2-L3 processing with S1(L2) w Gbps with delay <c ms and jitter <$c_1$ ns. MAC retransmission, scheduling, RLC, header compression and ciphering are centralized. L2/L3 processing is performed by Radio Network 601; L1 processing is performed by Small BS 605.

Option 4 describes centralized L3 processing with S1(L3)xGbps with delay <d ms and jitter <$d_1$ ns. RLC, header compression and ciphering are centralized. L3 processing is performed by Radio Network 601; L1/L2 processing is performed by Small BS 605.

Option 5 describes fully distributed radio processing with S1 y Gbps with delay <e ms and jitter <$e_1$ ns, i.e. according to the non-COMP traditional BTS solution. The Radio Network 601 serves as gateway; L1/L2/L3 processing is performed by Small BS 605.

The principle of BARC can be described as follows: First, RS and SBS send an initial and/or a periodic test sequence for the measurement of the data rate/BW and of the delay/jitter. For measurement of the UL BW, the RS measures an S/N and a BW of e.g. 500 Mbps. For measurement of the DL BW, the small BS measures a S/N and a BW of e.g. 1 Gbps. The DL measurement is sent to BHPS. In an implementation, GPS is implemented in the SBS and RS for exact and separated UL/DL determination. In an implementation form where no GPS is available, an estimation of UL/DL delay is achieved by measuring the round trip delay and BW under the assumption that the product of BW and delay is constant. The jitter is measured by observing the delay over time.

Secondly, the decision regarding the BW/delay/jitter mode is based on a look up table in BHPS and then, the BHPS informs the RS about possible backhaul modes.

In an implementation, a 3-step approach for the front and backend processing split is applied. In a first step, measurement of BW, delay and jitter in UL and DL in the backhaul is performed. In a second step, possible backhaul modes are stored in the BHPS. In a third step, the SON/RS selects an applicable mode for single UE or complete SBS.

Figure 7:
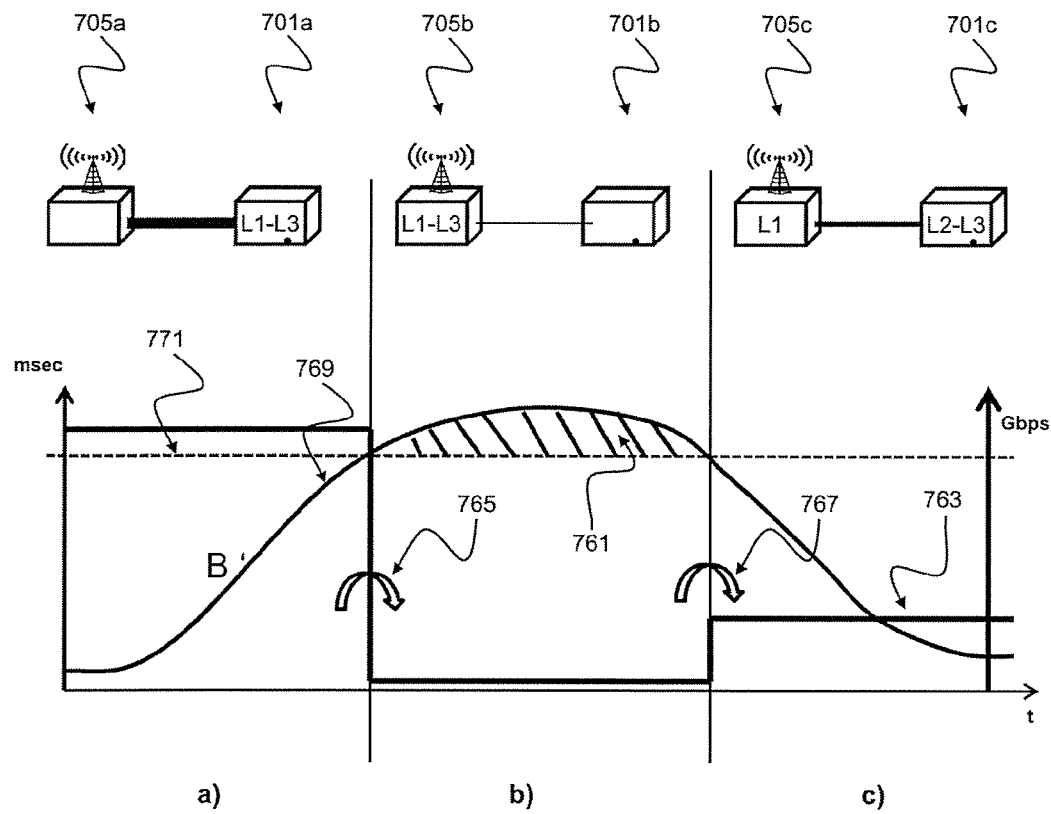
FIG. 7 shows a performance diagram of the radio communications system implementing an ARAP comprising BARC according to an implementation form.

FIG. 7 shows a performance diagram of the radio communications system implementing an ARAP comprising BARC according to an implementation form. In FIGS. 7a, 7b and 7c the lines between BSs 705a, 705b, 705c and RSs 701a, 701b, 701c are represented by different thickness. The thicker the line the higher the data rate on this interface.

FIG. 7a shows the backhaul delay for backhaul traffic B' in milliseconds over time t for data tapping and signal processing option 1 as described with respect to FIG. 6, i.e., L1/L2/L3 processing is performed in the RS 701a and not in the Small BS 705a. FIG. 7b shows the backhaul delay for backhaul traffic B' in milliseconds over time t for data tapping option 5 as described with respect to FIG. 6, i.e., L1/L2/L3 processing is performed in the small BS 705b and not in the RS 701b. FIG. 7c shows the backhaul delay for backhaul traffic B' in milliseconds over time t for data tapping option 3 as described with respect to FIG. 6, i.e., L2/L3 processing is performed in the RS 701c and L1 processing is performed in the SBS 705c. When the backhaul delay B' crosses a maximum tolerable delay 771, switching data tapping 765 is required and backhaul delay B' is reduced when switching from option 1 to option 5 (cf. FIG. 7a to FIG. 7b). When the QoE crosses an unacceptable low quality level 761, another switching data tapping 767 is required and backhaul delay B' is increased when switching from option 5 to option 3 (cf. FIG. 7b to FIG. 7c).

The benefits of BARC can be summarized as follows: The solution can adapt the radio access network to the limits of the backhaul (e.g. technology limitations in BW by using shared media such as GPON). The key benefit for the BARC is the possibility for the operator to minimize the backhaul cost for leased line backhaul, while having maximum spectrum efficiency in the radio access network. The operator can also balance a tradeoff between cost and the end-user QoE. In case the cost optimization is in the focus, the backhaul quality can be reduced by choosing less backhaul capacity. In case of customer requirement for low latency, the customer can dynamically increase the spectrum efficiency by choosing the better backhaul quality. The operator can provide "load curves" to the backhaul provider to negotiate a favorable leased line charge. The solution can help to increase the reach of the RS, while being compliant with the radio access 3GPP standards.

In an implementation form, the RS 701a, 701b, 701c and the small BS 705a, 705b, 705c are configured to measure radio network and backhaul network parameters based on the test sequence described above with respect to FIG. 5 and FIG. 6. In an implementation form, the RS and the small BS are configured to measure the radio network and backhaul network parameters for different switching modes of the dispatching means D1 of the MN 101 and the dispatching means D2 of the BS 105. In an implementation form, the radio communications system comprises a lookup table, the lookup table comprising the measured radio network and backhaul network parameters for the different switching modes. In an implementation form, the radio communications system is configured to select one of the switching modes of the dispatching means D1 of the MN 101 and the dispatching means D2 of the BS based on requirements for the radio network and backhaul network parameters.

Figure 8:
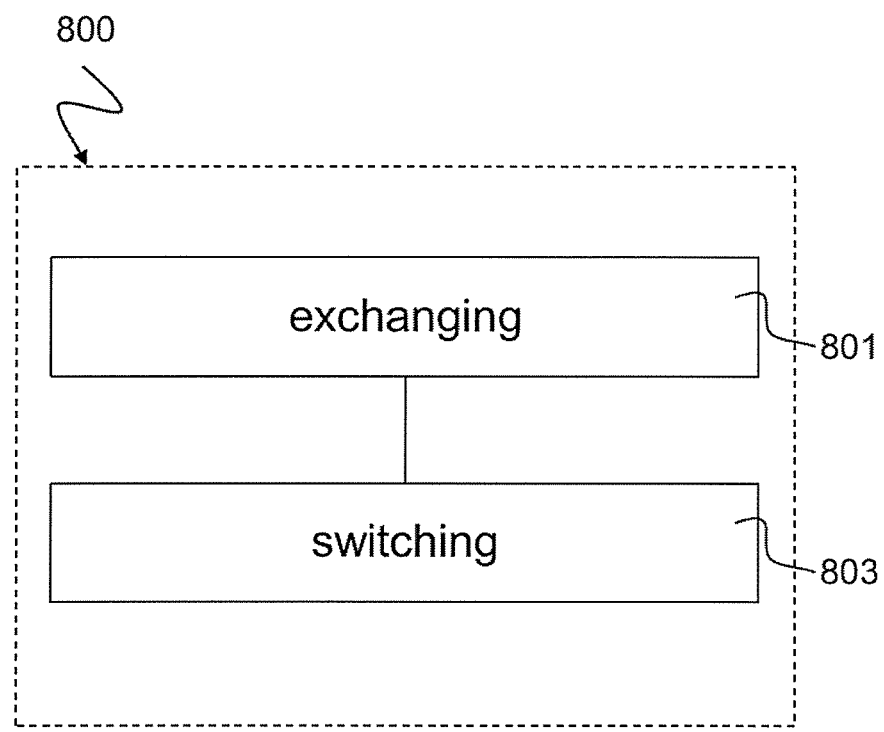
FIG. 8 shows a schematic diagram of a method for processing a radio communications system according to an implementation form.

FIG. 8 shows a schematic diagram of a method 800 for processing a radio communications system according to an implementation form. The radio communications system comprises a MN and a BS, e.g. a MN 101 as described with respect to FIG. 1 and a BS 105 as described with respect to FIG. 1. The MN 101 comprises a line of signal processing blocks and dispatching means switchable to taps and corresponding signal processing of the line of signal processing blocks. The BS 105 comprises a line of signal processing blocks and dispatching means switchable to taps and corresponding signal processing of the line of signal processing blocks. The method 800 comprises: exchanging 801 configuration information between the MN 101 and the BS 105. The exchanging step is performed by an exchanging entity. The method 800 further comprises: switching 803 the dispatching means of the MN 101 in correspondence to the dispatching means of the BS 105. The switching step is performed by a switching entity.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the invention beyond those described herein. While the present inventions has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

What is claimed is:

1. A radio communications system, comprising:
   a mobile network comprising a first line of signal processing blocks and dispatching means switchable to data taps of the first line of signal processing blocks;
   a base station comprising a second line of signal processing blocks and dispatching means switchable to data taps of the second line of signal processing blocks;
   wherein the mobile network and the base station are configured to exchange configuration information in order to switch the dispatching means of the mobile network in correspondence to the dispatching means of the base station;
   wherein the base station and the mobile network are configured to switch their dispatching means such that protocol layers of a radio communications protocol stack are selectively processed by the base station or by the mobile network; and
   wherein the base station and the mobile network are configured to switch off signal processing blocks that are not used for processing the protocol layer of the radio communications protocol stack.

2. The radio communications system of claim 1, wherein the switching of the dispatching means of the mobile network in correspondence to the dispatching means of the base station is based on profiling information provided by the base station.

3. The radio communications system of claim 2, wherein the profiling information comprises at least one of the following:
  a profiling part representing quality of service on an air interface of the radio communications system and comprising:
    interference situation information in uplink and downlink at a receiver side, in particular per user in a radio cell of the radio communications system; and
  a profiling part representing quality of service in a backhaul network and comprising at least one of the following:
    a number of supported frequency blocks,
    available radio technologies,
    a number of supported signal processing blocks, and
    provisioned backhaul standard and technologies, in particular SDH, TDM, ATM and IP.

4. The radio communications system of claim 2, wherein the mobile network and the base station are configured to switch their dispatching means based on the profiling information.

5. The radio communications system of claim 3, wherein the mobile network and the base station are configured to switch their dispatching means based on the profiling information.

6. The radio communications system of claim 1, wherein a part of a lower layer processing of the radio communications protocol stack is processed by the base station and a complementary part of the lower layer processing is processed by the mobile network or vice versa.

7. The radio communications system of claim 1, wherein the base station comprises a flexible small base station according to Small Cell Forum standardization or a distributed base station according to CPRI standardization.

8. A radio communications system, comprising:
  a mobile network comprising a first line of signal processing blocks and dispatching means switchable to data taps of the first line of signal processing blocks;
  a base station comprising a second line of signal processing blocks and dispatching means switchable to data taps of the second line of signal processing blocks;
  wherein the mobile network and the base station are configured to exchange configuration information in order to switch the dispatching means of the mobile network in correspondence to the dispatching means of the base station;
  wherein the base station and the mobile network are configured to switch their dispatching means such that protocol layers of the radio communications protocol stack are selectively processed by the base station or by the mobile network;
  wherein a part of a lower layer processing of the radio communications protocol stack is processed by the base station and a complementary part of the lower layer processing is processed by the mobile network or vice versa; and
  wherein the base station and the mobile network are configured to switch off signal processing blocks that are not used for processing the protocol layer of the radio communications protocol stack.

9. A method for processing a radio communications system comprising a mobile network and a base station, the mobile network comprising a line of signal processing blocks and dispatching means switchable to data taps of the line of signal processing blocks, and the base station comprising a line of signal processing blocks and dispatching means switchable to data taps of the line of signal processing blocks, the method comprising:
  exchanging configuration information between the mobile network and the base station;
  switching the dispatching means of the mobile network in correspondence to the dispatching means of the base station such that protocol layers of a radio communications protocol stack are selectively processed by the base station or by the mobile network; and
  switching off signal processing blocks that are not used for processing the protocol layers of the radio communications protocol stack.

* * * * *